United States Patent [19]

Key et al.

[11] 3,842,405

[45] Oct. 15, 1974

[54] COMMUNICATIONS CONTROL UNIT

[75] Inventors: Brian D. Key, Winchester; Michael L. Kingdom Hockings; Michael N. G. Lovelace, both of Chandlers Ford; Howard C. Rankin, Southampton; Jonathan B. Stredwick, Chandlers Ford, all of England

[73] Assignee: International Business Machines Corporation, Armonk, N.Y.

[22] Filed: Feb. 15, 1972

[21] Appl. No.: 226,441

[30] Foreign Application Priority Data

Mar. 2, 1971 Great Britain ...................... 5880/71

[52] U.S. Cl. ............................................. 340/172.5

[51] Int. Cl. ............................................. G06f 9/16

[58] Field of Search .................................. 340/172.5

[56] References Cited

UNITED STATES PATENTS

| | | | |
|---|---|---|---|
| 3,564,509 | 2/1971 | Perkins et al. | 340/172.5 |
| 3,573,741 | 4/1971 | Gavril | 340/172.5 |
| 3,618,037 | 11/1971 | Wollum et al. | 340/172.5 |
| 3,623,010 | 11/1971 | Burkhalter | 340/172.5 |
| 3,689,895 | 9/1972 | Kitamura | 340/172.5 |

*Primary Examiner*—Gareth D. Shaw
*Assistant Examiner*—Michael Sachs
*Attorney, Agent, or Firm*—John C. Black

[57] ABSTRACT

A communications control unit, integrated into a processor, enables lines and modems to be changed or replaced by different types of lines and modems without changing the control unit hardware. A common modem adapter design can be used in the control unit for different data rates. A processor microprogram and a simple control unit local microprogram (dynamically changeable during the transfer of data) obviate the need for different adapters for each line and modem type. Both microprograms cooperate to control data transfer.

6 Claims, 18 Drawing Figures

PC = PARITY CHECK
PG = PARITY GENERATOR

PC = PARITY CHECK
PG = PARITY GENERATOR

COMMUNICATIONS CONTROL UNIT

BACKGROUND OF THE INVENTION

1. Field of the Invention

The present invention relates to a communications control unit. Communications control units connect a plurality of communication lines from remote terminals to a data processing system. The control unit provides controls and buffering of data for each of the lines which are handled in turn. Such a control unit is often called a multiplexer. Each of the communication lines is connected to the control unit by a modem. A modem provides an interface between the control unit and the line, i.e., converts the communication line signals to those of the control unit and vice versa. Each different type of communication line and its remote terminal require a different type of modem adapter. Several different types of modem adapters are usually connected to one control unit.

2. Description of the Prior Art

The communication control units have previously been connected to data processing systems either directly or by means of an input/output channel of the processing system. When the control unit is directly connected to a data processing system, it is sometimes termed a 'native' communications control unit. U.S. Pat. No. 3,500,328 issued Mar. 10, 1970, to D. E. Wallis shows such a unit. A native communications unit has been attached to a processor as described in a publication GA24-3526 published by and available from International Business Machines Corporation. When the communications control unit is connected to a data processing system by an input/output channel, it is sometimes called a data adapter unit. The data adapter unit described in publication A22-6864 published by and available from International Business Machines Corporation, is an example of such a control unit.

Previously when a terminal was replaced or added to a data processing system, it was necessary to make physical changes to the control unit. Such changes were expensive both in time and parts.

SUMMARY OF THE INVENTION

The present invention provides a unit for connecting a plurality of communication lines to a data processing system comprising a store for storing data including control signals and information in transmission, means for accessing the store and means for operating on data accessed from the store, in which the accessing and operating means are controlled by a sequence consisting of control signals from the store and control signals from the processing system.

In operation, each location in the store is accessed in a given sequence. However, the accessing means is adapted to interrupt the given sequence for accessing the store at a location defined by an address provided by the processing system.

The given sequence is preferably a sequence of locations in numerical address order so that the next address can bé generated by incrementing the current address. Using this given sequence branch signals can be eliminated. Alternatively, the given sequence can be determined by incrementing the address of locations in the store and by using branch instructions.

The control signals are preferably in the form of microinstructions transferred from the processor to the store. Some of the microinstructions of the given sequence are used for storing data. Other microinstructions are used for monitoring modem adapter tag lines and further microinstructions are used for synchronizing data transmission rates on a communication line with the accessing of the given sequence.

In a preferred form of the invention synchronization of the accessing of the given sequence with the data rate on each of the lines is achieved by count microinstructions which precede the data storing microinstructions. The count microinstructions are arranged to inhibit data transfer except when the count has just overflowed.

The store positions accessed in the given sequence have a plurality of portions, each portion associated with one of the communication lines. A typical portion has a microinstruction to set the line active (Set Up) and to monitor Tags, one or more count microinstructions (Start, Count or Hesitate) and a microinstruction to store or buffer data received from or transmitted to the line. The adapters may be processor clocked or modem clocked. Synchronization is achieved with a processor clocked adapter by varying the value of a count supplied by the processing system and with a modem clocked adapter by using a timing signal from the adapter to modify the effect of the Set Up microinstruction.

Data is transferred between the stroe and the processing system by accessing the store under the control of the processing system microprogram in response to the setting of an interrupt bit.

The foregoing and other objects, features and advantages of the invention will be apparent from the following more particular description of a preferred embodiment of the invention, as illustrated in the accompanying drawings.

FIGS. 3*a* – 9*a* and 3*b* – 9*b* and 10–14 illustrate the operation of the control unit during the execution of local microinstructions.

Figure 1:
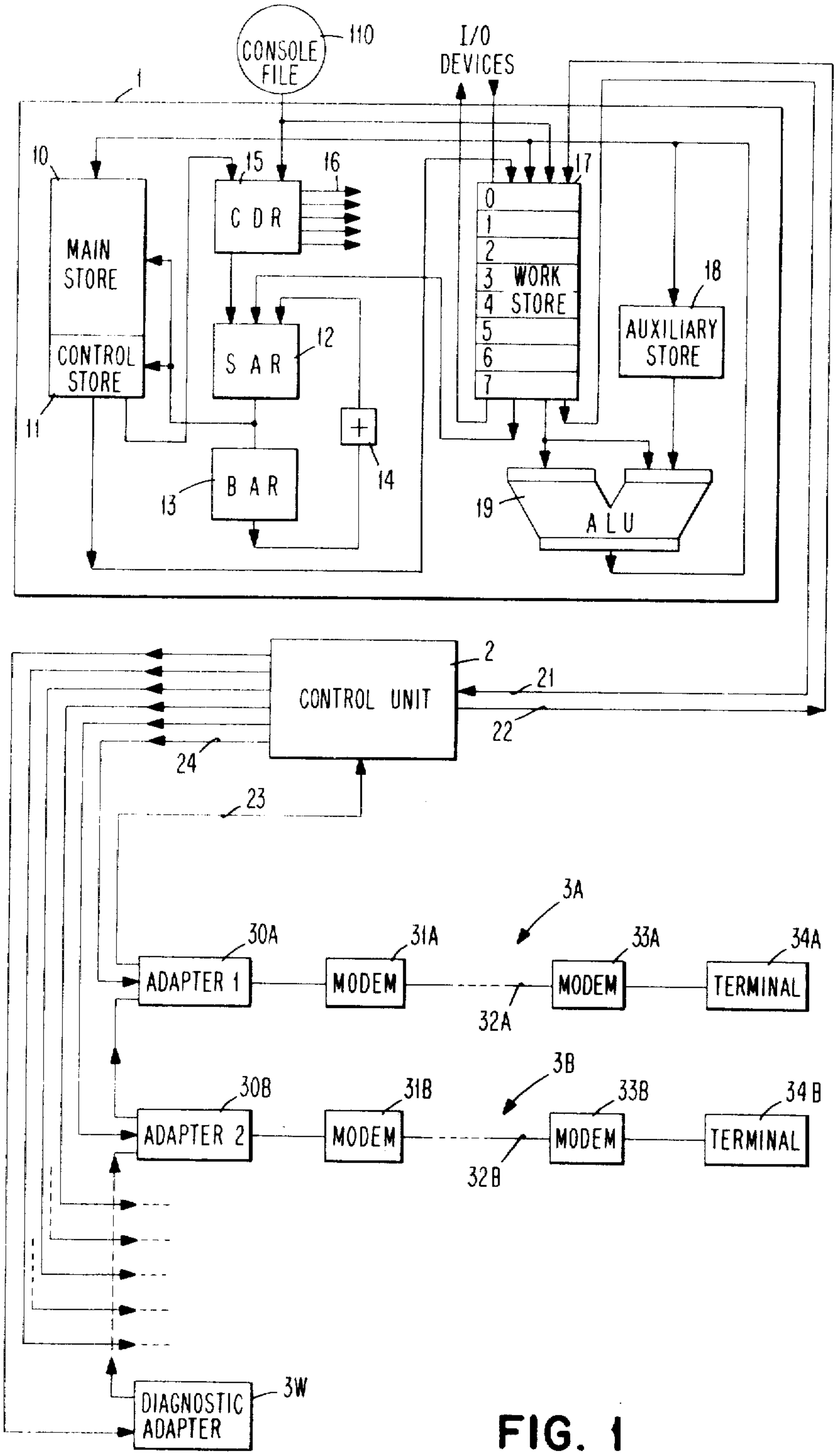
FIG. 1 shows a data processing system having a control unit according to the present invention for connecting a plurality of communication lines to the processing system.

FIG. 1 shows a data processing system (processor) 1 and a control unit or multiplexer 2 for connecting a plurality of communication lines 3A, 3B ... to the system 1. System 1 can be generally of the type described in greater detail in published patent application No. 21156558, published Oct. 21, 1971, by the Federal Republic of Germany. The data processing system 1 comprises a main store 10 for data and program instructions, and a control store 11 for microinstructions and control registers for controlling the system 1. Main store 10 and control store 11 are addressed using a Storage Address Register (SAR) 12 which can be incremented by means of Buffer Address Register (BAR) 13 and Incrementer 14. The microinstruction currently controlling the system is stored in Control Data Register (CDR) 15. Decode signals from the CDR are transmitted on lines 16 to the various parts of system 1. System 1 also includes a Work Store 17 having eight separate zones 0 to 7 each allocated to a different function, such as ALU operations, or to an I/O device such as a disk file. One zone of Work Store 17 is allocated to the control unit 2 for use by the communication lines 3A, 3B .... An auxiliary store 18 is provided for various registers such as General Purpose Registers (GPR) and Floating Point Registers (FPR). The various logical and arithmetic operations are executed in an arithmetic and logic unit (ALU) 19. Operands processed by the ALU are obtained from the work store and/or auxiliary store. Control store 11 is loaded with microinstructions and control data from a private disk file 110 located in the console of the processing system. The private disk file 110 has access to control store through CDR 15 and work store 17 and loading of the microprogram is initiated by using an initial microprogram load button on the console.

Communication between the processing system 1 and the control unit 2, as with other I/O devices, is achieved using a zone of work store. Only one zone of work store 17 is active at any one time. Work store 17 has associated therewith a conventional microprogram interrupt system (not shown) which permits microprogram service, on a priority basis, to the processing unit and to the various I/O devices using the data flow. The CPU 1 and each of the I/O devices is assigned a priority level or a number of levels according to their relative importance. Since several devices may be accorded the same level, a sub-level order is used, i.e., devices having the same level are all serviced in a predetermined order so that no device can be excluded by others at the same priority level. When a microprogram interrupt is accepted, the status of the interrupted microprogram including the next microprogram address from which a restart will be made, is preserved in the allocated zone of work store 17. The status of up to seven microprograms can thus be preserved at any one time.

A number of communications lines 3A, 3B ... are connected to the control unit 2. In the present example, eight lines are present. Each communication line includes an adapter such as 30A, 30B, a modem such as 31A, 31B, connected to the near end of a telephone or telegraph line such as 32A, 32B, and a modem such as 33A, 33B, and terminal such as 34A, 34B connected to the remote end of the line.

Data is transferred between system 1 and the control unit 2 under the control of system 1's microprogram. Data is transferred between control unit 2 and the remote terminals under the control of the control unit 2 itself, e.g., data is transmitted from control unit 2 to adapter 30A which transfers data serial-by-bit to the modem 31A. At the remote station, modem 33A demodulates the signal on line 32A and transfers the transmitted data to terminal 34A.

Line 32A may be operated in full-duplex mode, i.e., data is transmitted in both directions simultaneously (carrier is active in both directions simultaneously) or may be operated in half-duplex, i.e., a message may be acknowledged as soon as it is received (carrier can go in either direction, but only one direction at any given time). Half-duplex line control can be used on full-duplex lines. This achieves a shorter turnaround than with a half-duplex line.

Communication can be either start/stop or binary synchronous. In start/stop operation each character is clocked separately and gaps between characters are permitted. The start of each character is signaled by the Start Bit - a binary 0 which precedes the data and the end of each character is followed by a Stop Bit - a binary 1. In binary synchronous operation there are no gaps between the characters and no clock bits within each character. Synchronism is established by means of "SYN" characters which occur at intervals during the transmission. Bit clocking can be provided for start/stop or binary synchronous either by the processor system or by the modem. A processor clocked modem adapter (PCMA) is used when the clocking is provided by the processing system and a modem clocked modem adapter (MCMA) is used when clocking is provided by the modem.

Start/stop operation using known terminals with an appropriate PCMA and modem can transmit data at 134.5; 600; or 1200 bits/second. When a MCMA is used, the data rate can be increased to 2400 bits/second.

Binary synchronous operation can transmit data at 600, 1200, 2400, or 4800 bits/second, the latter two rates requiring a MCMA and an adapter as a terminal device at the remote end of the line.

Bit buffering and clocking are handled by control unit 2. More complex functions such as code translation, parity checking, address incrementing, generation of cyclic redundancy checks, bit timing for processor clocked lines, and recognition of line control characters in the data received, are handled by the microprogram of processing system 1.

Each modem communicates with the control unit 2 using a standard interface. Line drivers and terminators in the adapters convert the standard interface voltages to the control unit voltage levels and vice versa. A PCMA has the following interface lines:

Interface with Control Unit

| Outbound | | Inbound | |
|---|---|---|---|
| Transmitted Data (T x D) | | Received Data (R x D) | |
| Request to Send | Tags Out | Clear to Send | Tags In |
| Data Terminal Ready | Tags Out | Data Set Ready | Tags In |
| (or Connect Data Set to Line) | | Ring Indicator | Tags In |
| | | Data Carrier Detector | Tags In |

The outbound lines are latched in the PCMA and the inbound lines are sampled by the control unit 2.

A MCMA has the following additional lines:

Interface with Modem

| Outbound | Inbound |
|---|---|
| New Synch. | Transmitted Signal Element Timing |

-Continued

Interface with Modem

| Outbound | | Inbound |
|---|---|---|
| | | Received Signal Element Timing |
| **Interface with Control Unit** | | |
| Outbound | | Inbound |
| Set Write Latch<br>New Synch. | } Tags Out | Signal Element Timing (Tags In) |

Figure 2:
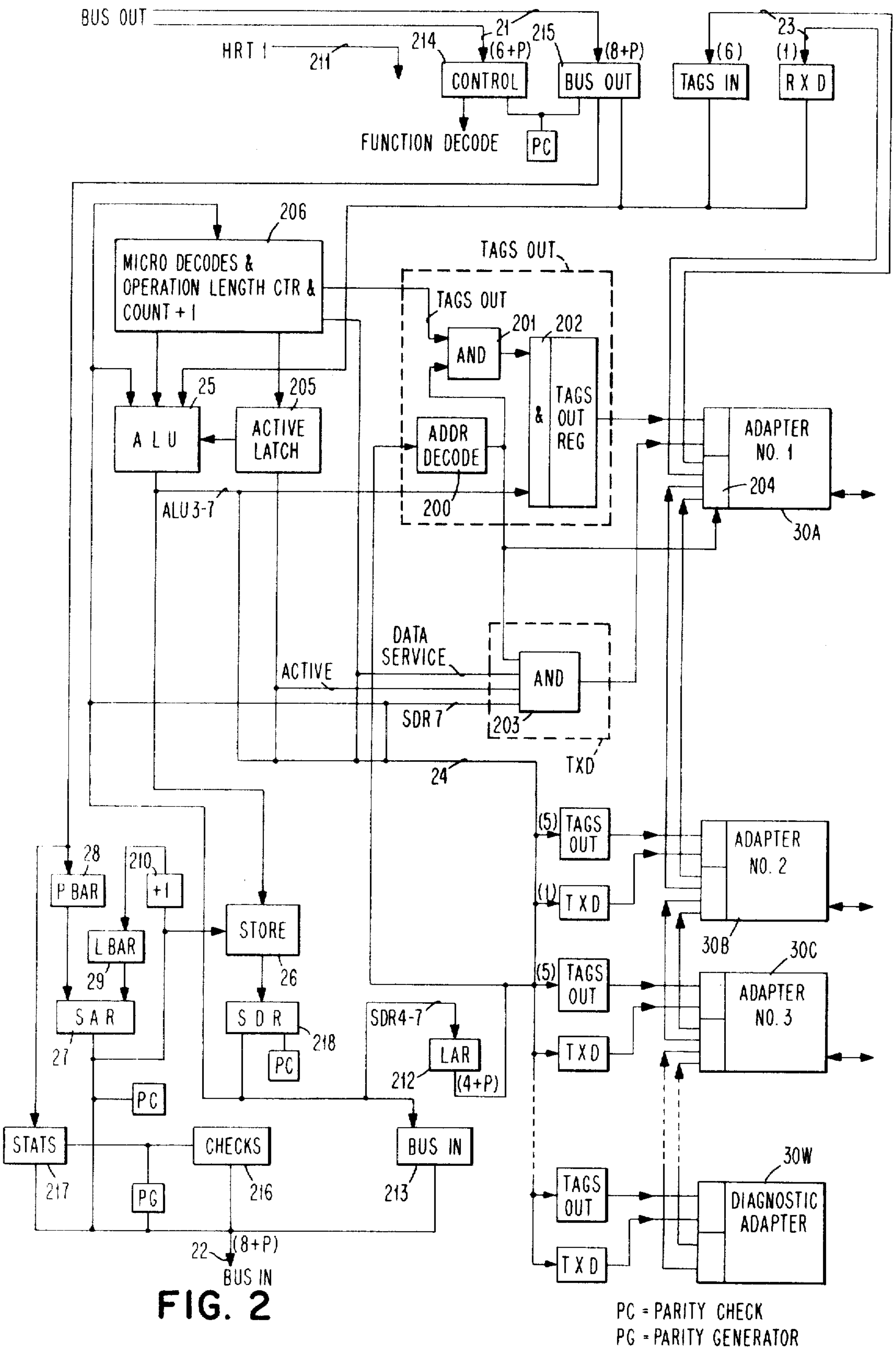
FIG. 2 shows the control unit shown in FIG. 1 in greater detail.

The control unit 2 is shown in FIG. 2 in greater detail. The unit has lines 21 on which data and control signals are received from the processing system 1, lines 22 on which data and control signals are transmitted to the processor, lines 23 on which data and tags are received from the adapters, and lines 24 on which data and tags are transmitted to the adapters. Lines 23 are common to each adapter, each adapter forming a link in a chain so that data from one adapter passed through each succeeding adapter in the chain. Data is applied to lines 23 by an adapter under the control of Line Address Register 212 and decode circuits such as 200. Lines 24 provide a separate connection to each adapter. An adapter is selected by gates such as 200 - 204 controlled by Line Address Register (LAR) 212 and the adapter decode circuits such as circuit 200. The function of adapter 30W called a diagnostic adapter which is not connected to a communication line will be described later.

The control unit includes a microinstruction decode unit 206, an arithmetic and logical unit 25, a store 26 and a storage address register (SAR) 27. An address is entered into SAR 27 from either a processor buffer address register (PBAR) 28 or from a local buffer address register (LBAR) 29. A selected address is entered into PBAR 28 when the processing system 1 requires an access to the store 26 for storing, fetching or modifying data therein. Addresses are entered into LBAR 29 by incrementer 210.

The size of store 26 depends on the number and type of the communication lines 3A, 3B ... . In a preferred embodiment, a maximum of 8 bytes of storage is required for each line in this example so that the maximum size of store 26 is 64 bytes, although 16, 32 or 48 byte stores could be used without changing the remainder of the control unit.

In a preferred embodiment, the bytes of storage associated with each line are stored in consecutive locations and provide an individual microprogram routine designed for its associated line's requirements. The store 26 is normally loaded with certain microprogram routines by processing system 1's microprogram at the time the initial microprogram is loaded from the private console file 110 and at the beginning of a read or write operation, e.g., via work store 17 and line 21.

In one cycle of operation of the store 26, each location of the store 26 is accessed in turn. Every 13 microseconds a pulse, from a high resolution timer (not shown) of the processing system, on line 211 triggers a cycle of the store 26. Each access of the store requires 165 nanoseconds which is 3 cycles of the processing system 1's microprogram. After the last location in the store 26 has been accessed, there is a pause until the next high resolution timer pulse on line 211.

The accessing of each location in turn is effected by SAR 27, incrementer 210 and LBAR 29. The length of the pause depends on the number of accesses of the store 26 initiated by the processing system 1 using SAR 27 and PBAR 28. The processing system can interrupt the incrementing for one cycle at any one time, i.e., for 165 nanoseconds. However, the incrementing of the address in LBAR 29 is inhibited if the address in SAR 27 had been obtained from PBAR 28 so that the accessing of the store can continue from where it was interrupted.

The operation of the control unit 2 will now be described firstly with reference to the microprogram routines stored in store 26 and secondly with reference to the control provided by processing system 1.

The microprogram routines in store 26 provide for a variety of remote terminals, line facilities, modem interfaces, codes and data rates. In addition, the microprogram routine for a particular one of lines 3A, 3B ... can be easily changed using the console file 110. The microinstructions in store 26 are used for control and for buffering of data. The ALU 25 has an associated active latch 205 which inhibits execution of an accessed microinstruction in the ALU 25 when reset and allows execution when set. The following microinstructions which may be of 1, 2 or 3 bytes are used in the preferred embodiment:

| Microinstruction OP Code | Description | Length |
|---|---|---|
| 1. 0 0 0 0 0 0 0 0 | NO OP | 1 byte |
| 2. 0 0 0 I 0 1 x D | Data Service (1 bit buffer) | 1 byte |
| 3. 0 0 1 1 B S S S<br>D D D D D D D D<br>D D D D D D D D | Data Service (2 byte buffer) | 3 bytes |
| 4. 0 1 0 X X X X X | Write Tags Out | 1 byte |
| 5. 0 1 1 A L L L L<br>M E I T T T T T | Set Up | 2 bytes |
| 6. 1 0 0 C C C C C | Start | 1 byte |
| 7. 1 0 1 C C C C C | Count 32 | 1 byte |
| 8. 1 1 C C C C C C | Hesitate | 1 byte |

where I = interrupt; D = data; S,B = bit shift count; A = active; C = count; L = line address; M = MCMA; E = signal element timing; T = tags The function of each individual microinstruction will now be described together with the operation performed by the ALU in response to decoding of the op code of that microinstruction:

1. NO OP

This microinstruction does not effect any operation in the ALU 25 or unit 206.

DATA SERVICE The Data Service microinstructions described in detail hereinafter buffer data. The three byte Data Service microinstruction also serializes or deserializes data. This microinstruction operates as a shift register (in store 26) whose input is Received Data line (R x D) 23 and whose output is a Transmit Data latch (T x D) of FIG. 2. Each Data Service microinstruction requests attention from the data processing system by causing an interrupt when the whole buffer has been serviced.

2. Data Service (1 Bit Buffer)

Figure 3A:
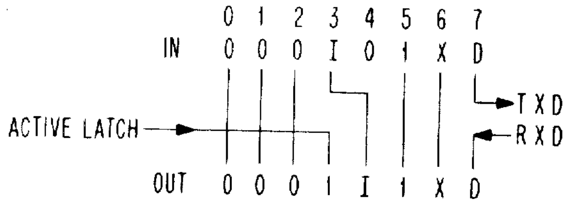
Figure 3B:
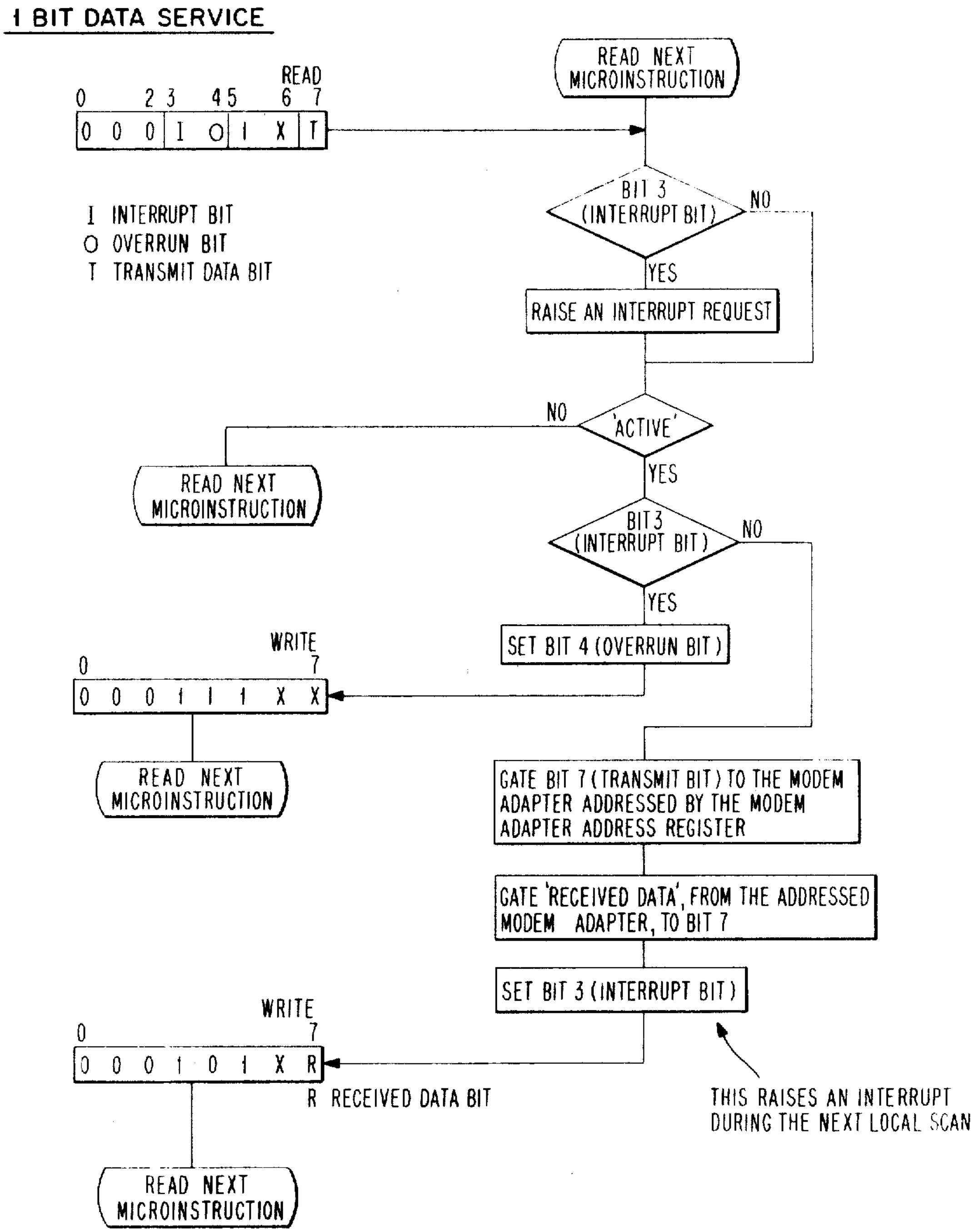

The operation of unit 2 is illustrated in FIGS. 3*a*, 3*b*. The operation of the ALU 25 depends on whether the Active Latch 205 is set to 1.

1. If the Active Latch 205 is set to 1: The old value of bit position 3 is written into bit 4. Bit 4 is tested by the processing systems' microprogram and if 1 it indicates that an overrun has occurred. If bit 3 is 0, bit 7 is gated to T X D (transmitted data), R X D (received data) is written into bit 7 and bit 3 is set to 1. This will cause an adapter to SET a microprogram INTERRUPT request which is executed by the processing system during the next cycle of the store.
2. If the Active Latch is reset: No operation takes place.

3. Data Service (2 Byte Buffer)

Figure 4A:
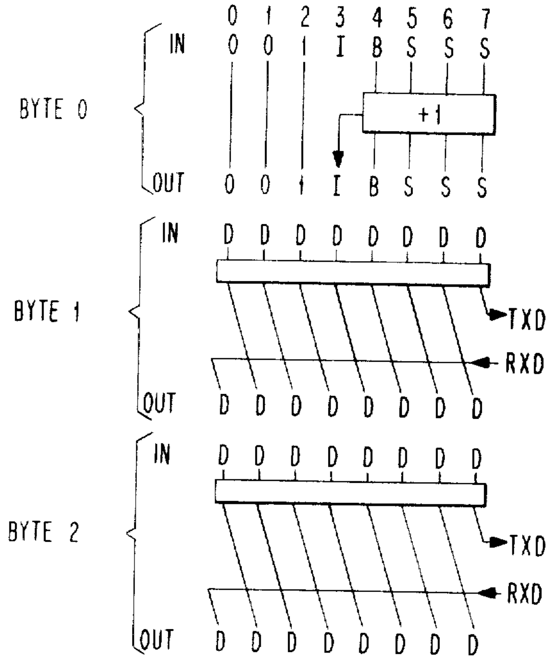
Figure 4B:
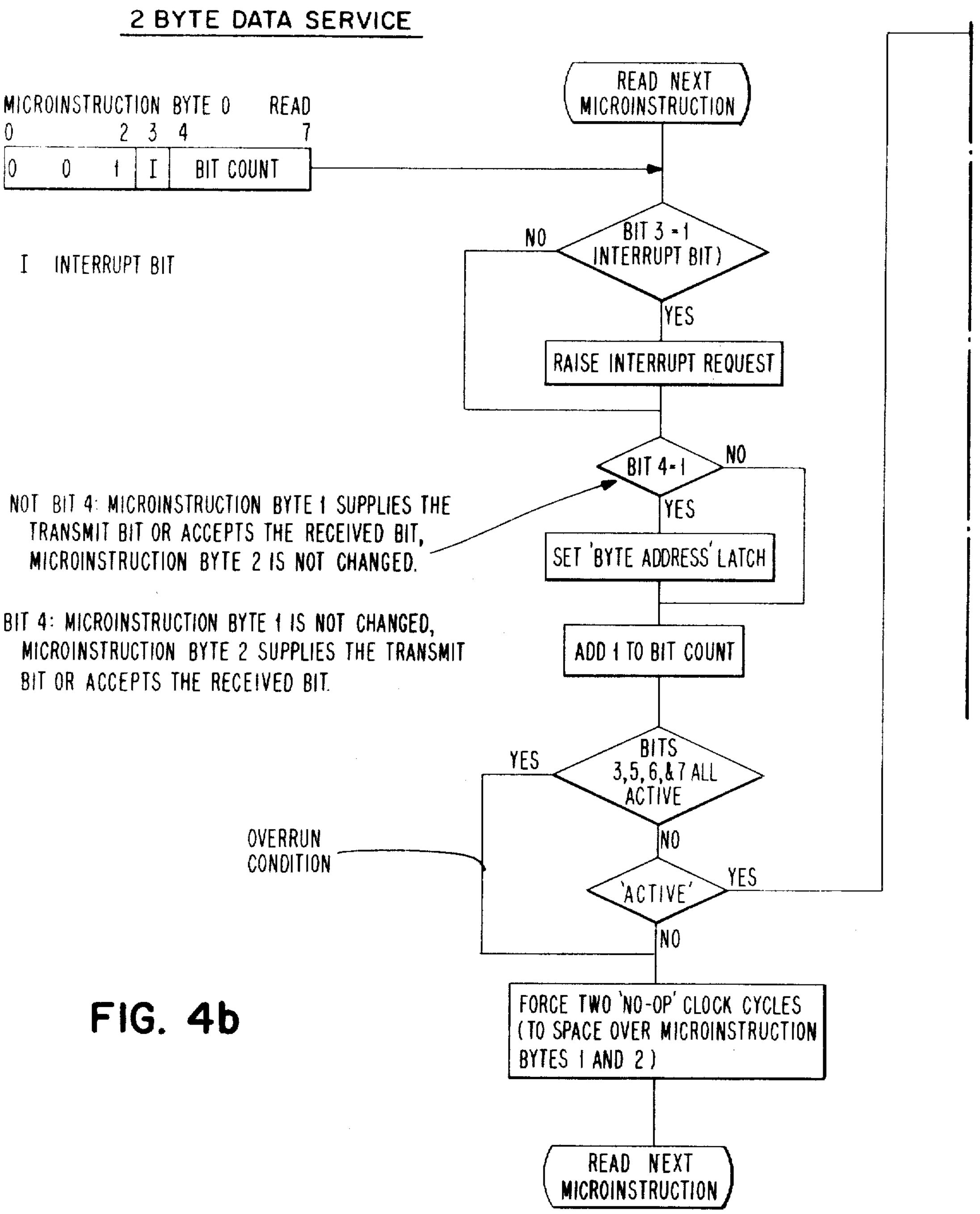
Figure 4D:
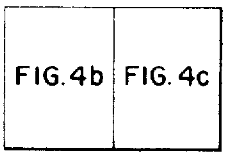
Figure 4C:
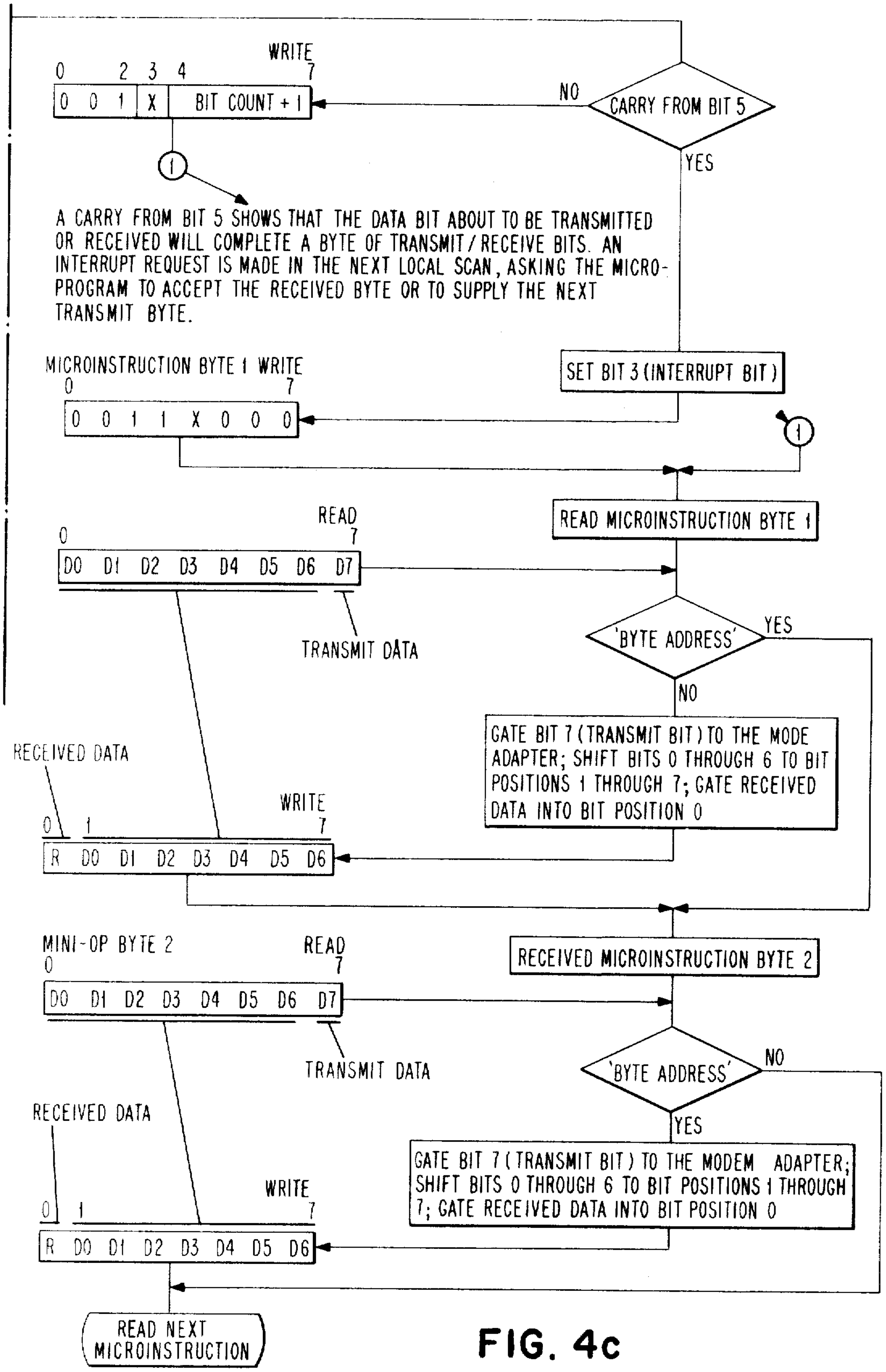

The operation of unit 2 is illustrated in FIGS. 4*a*, 4*b*. The ALU processes each of the bytes 0, 1, 2 in turn. Byte 0, bit 4 determines which of the bytes 1 or 2 will be changed. As before the operation depends on whether the active latch is set:

If the active latch 205 is set and if byte 0 bit 3, 5, 6, 7 are not all equal to 1: Byte 0 bits 4, 5, 6, 7 (the bit shift and byte count) are incremented by 1. If this causes an overflow from bit 5, bit 3 is set to 1. This causes a Set Interrupt to be executed by the processing system 1 during a subsequent cycle of the store. The value of byte 0 bit 4 determines which of the data bytes 1 or 2 is changed. If bit 4 is 0, Byte 1 is changed or if bit 4 is 1, Byte 2 is changed. In the selected data byte, Bit 7 is gated to transmitted data (T X D), the remaining bits are shifted right by one bit position and Received Data (R X D) is written into bit 0. Byte 0, Bits 3, 5, 6, 7 can be tested by the processing system microprogram to determine if an overrun has occurred.

4. Write Tags Out

Figure 5A:
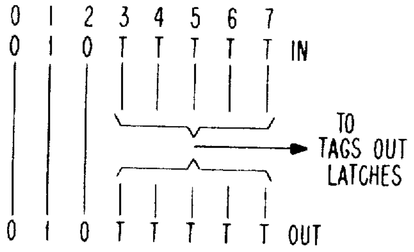
Figure 5B:
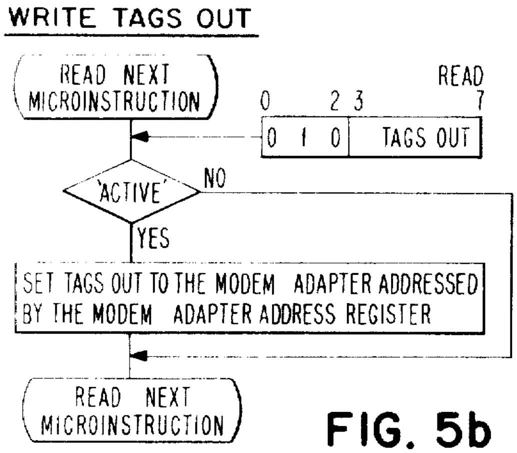

The tags, which control the operation of the modem, are written by Write Tags Out microinstruction which operates as follows, the operation of unit 2 being illustrated in FIGS. 5*a*, 5*b*.

If the active latch is set, bits 3 to 7 are transferred to Tags Out Latches, but if the active latch 205 is reset, no action is taken.

Tags Out are defined as

| PCMA | Bit | |
|---|---|---|
| | 3 | not used |
| | 4 | not used |
| | 5 | Request to Send |
| | 6 | Data terminal Ready |
| | 7 | New Start |
| MCMA | Bit | |
| | 3 | Select Speed |
| | 4 | New Sync |
| | 5 | Request to Send |
| | 6 | Data terminal Ready |
| | 7 | Write Latch |

N.B. The Write Latch is not an Out Tag, but is settable by Write Tags Out.

Each adapter has a Tags Out Register (or Latches).

5. Set Up

The Set-Up microinstruction is always the first microinstruction in each routine for any line. Set-Up defines the line number and makes the line active. Several succeeding microinstructions in a routine can reset the active state if specific conditions are satisfied. If the active state is reset, most microinstructions are treated as NO OPS. The Set Up microinstruction is used to perform clocking functions as well as to enable lines.

The Set Up microinstruction also monitors incoming Tags from the adapters and interrupts the processing system every time a tag such as Data Set Ready changes state. Bit clocking by the modem clock is executed by the Set Up microinstruction. The Transmit/Receive Signal Element Timing resets the active state except when the former has just fallen.

Figure 6A:
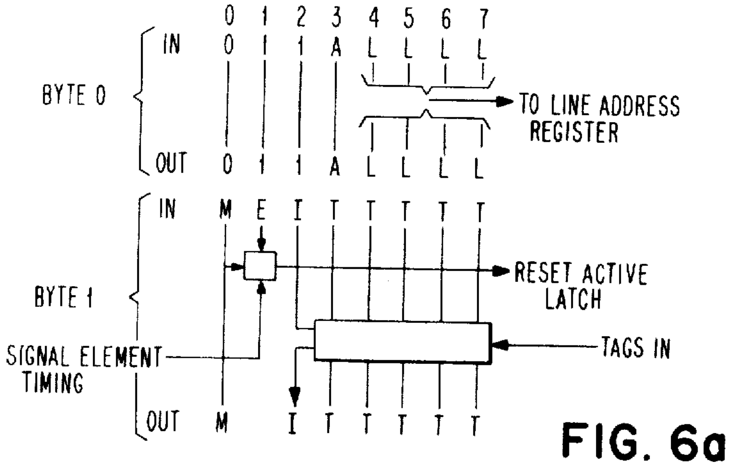
Figure 6B:
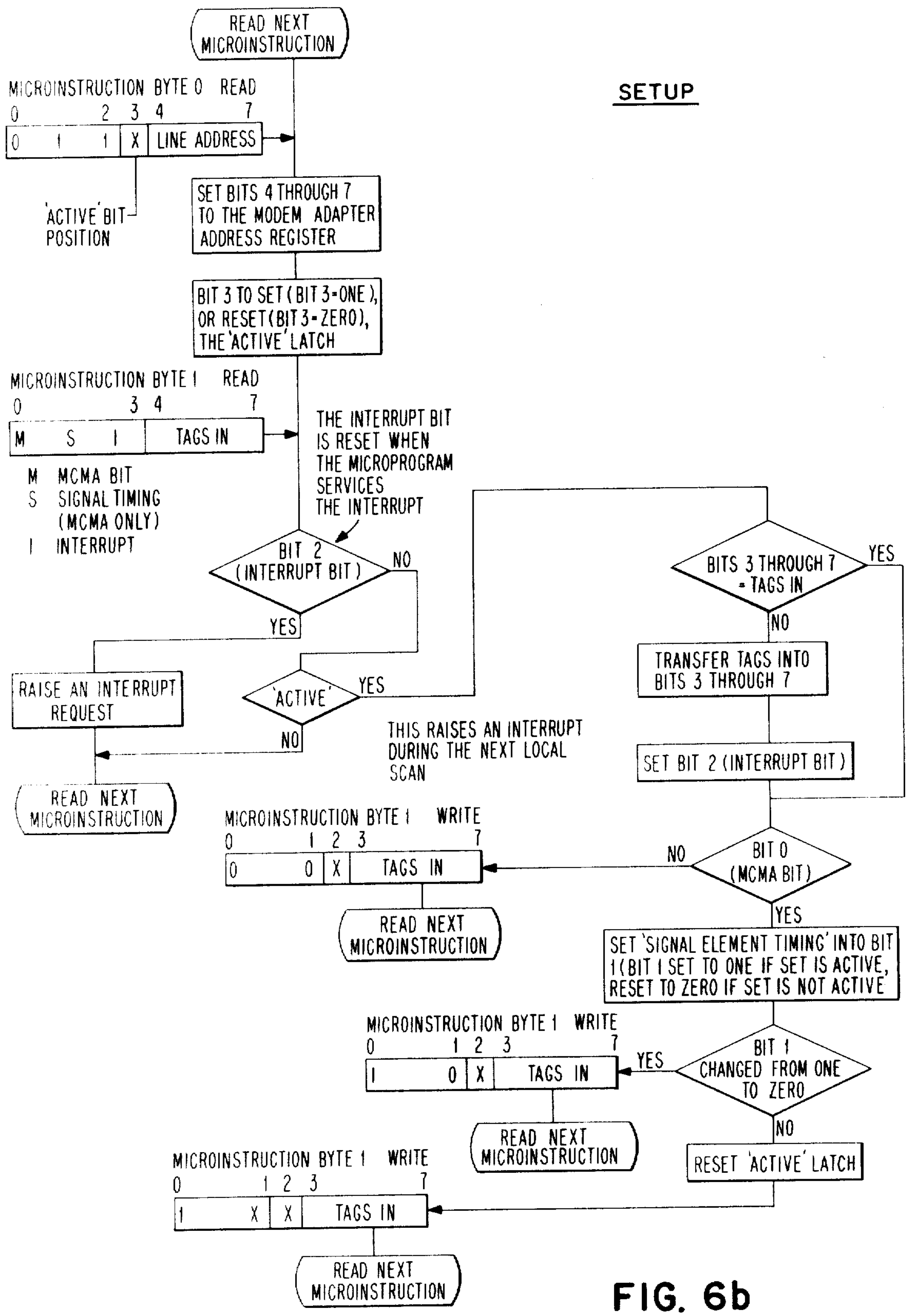

The operation of unit 2 is illustrated in FIGS. 6*a*, 6*b*.

The Set Up microinstruction is executed by the ALU as follows:

1. Byte 0, bits 4 to 7 are transferred to the Line Address Register (LAR) 212.
2. The content of byte 0, bit 3 is transferred to the active latch (0 is reset and 1 is set). Byte 0, bit 3 is set to 1 when a data transfer request (i.e., Start I/O) occurs in the processor 1. If the active latch 205 is reset, Byte 1 is unchanged. If the active latch is set, byte 1 is changed as follows:
   a. If bit 2 (interrupt) is 0, Tags In bits 3 to 7 are written into bits 3 to 7. If bit 2 is 1, bits 3 to 7 are not changed.
   b. If any of bits 3 to 7 are changed as in (a) then bit 2 (interrupt) is set to 1. Otherwise bit 2 is not changed.
   c. Tags In BIT 2 (signal element timing) is written into bit 1.
   d. If bit 0 (MCMA) is 1 and bit 1 is not changed from 1 to 0 as in (c), the active latch is reset.

Tags In is defined by

| Bit | Definition |
|---|---|
| 0 | Not used |
| 1 | Not used |
| 2 | Signal Element Timing |
| 3 | Ring Indicator |
| 4 | Data Carrier Detector |
| 5 | Clear to Send |
| 6 | Data Set Ready |
| 7 | Used for Automatic Calling Unit |

Where an adapter does not supply a bit, a 0 is inserted from the diagnostic adapter, e.g., PCMA does not supply bit 2.

6. Start

The initial synchronization of lines clocked by the processing system's clock (processor clocked lines) is effected by the start microinstruction. This always resets the active state (i.e., latch 205), but when Receive Data is zero, the microinstruction starts to count down. If the Receive Data is zero when the count reaches zero, Start is transformed into a Count 32 instruction which counts a further 32 before allowing the active state to be maintained set for executing the next microinstruction. If Receive Data is 1 before Start has counted to zero, the Start microinstruction is restarted. This allows the Start microinstruction to ignore translations lasting less than 416 microseconds (count of 32).

Figure 7A:
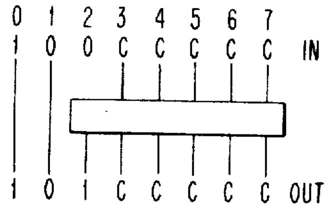
Figure 7B:
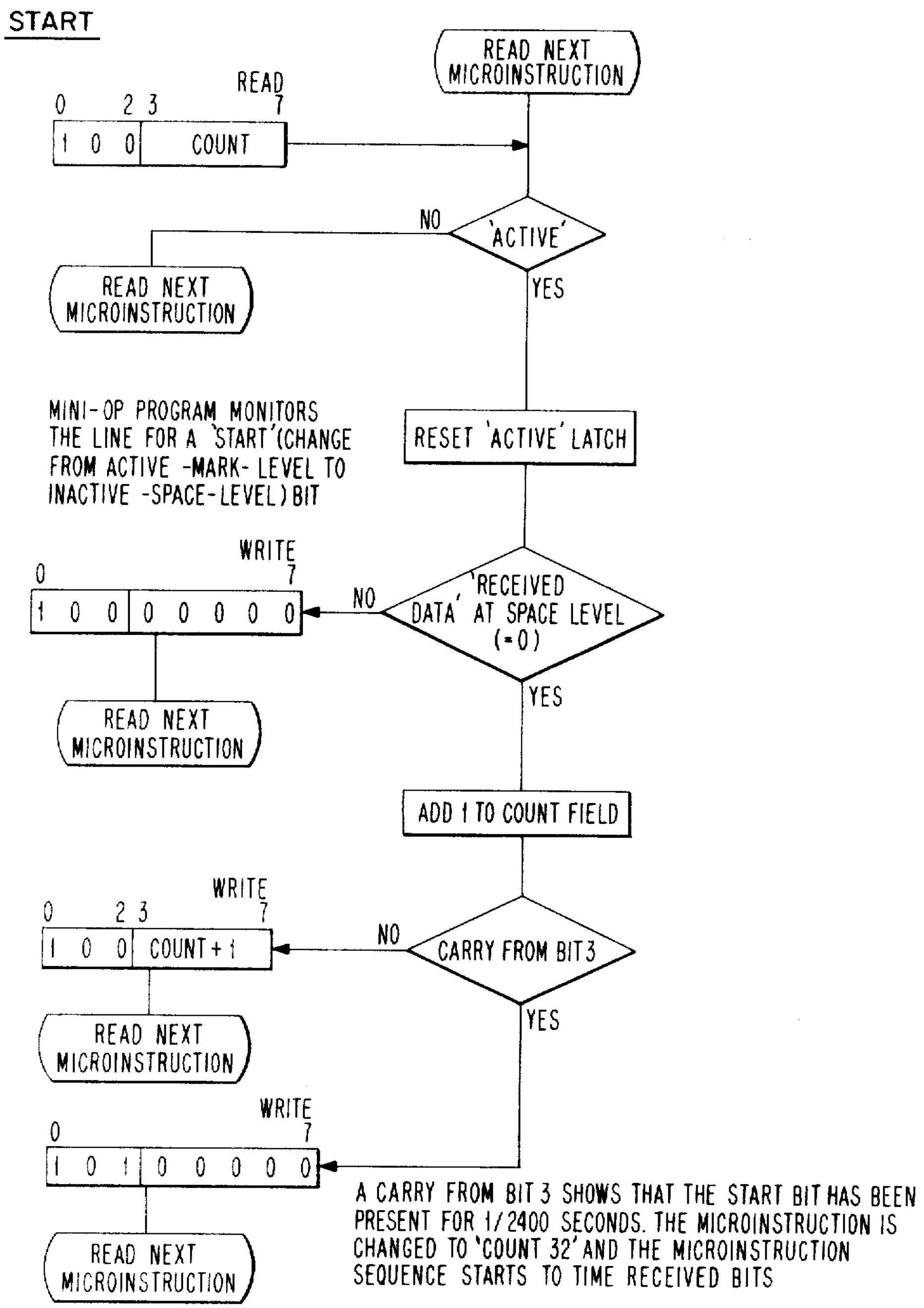

The operation of unit 2 is illustrated in FIGS. 7*a*, 7*b*.

a. If the active latch 205 is set:

1. If Received data (R X D) is 1, bits 3 to 7 are set to zero;
2. If Received data (R X D) is 0, bits 3 to 7 are incremented by 1.

A carry into write bit 2 will alter the start op code to a Count 32 microinstruction.

b. If the active latch 205 is reset, no operation takes place.

7. Count 32

The Count 32 microinstruction is used for bit clocking with a PCMA. The active state is reset except when the count has just passed through zero. Count 32 allows the active state to be maintained set once every 416 6 microseconds equivalent to a clock rate of 2,400 cycles/second to permit execution of the next microinstruction. Two Count 32 microinstructions are used sequentially for some data transfer rates.

Figure 8A:
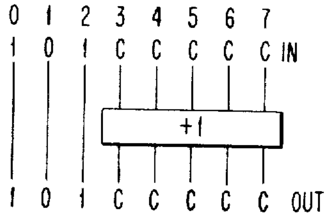
Figure 8B:
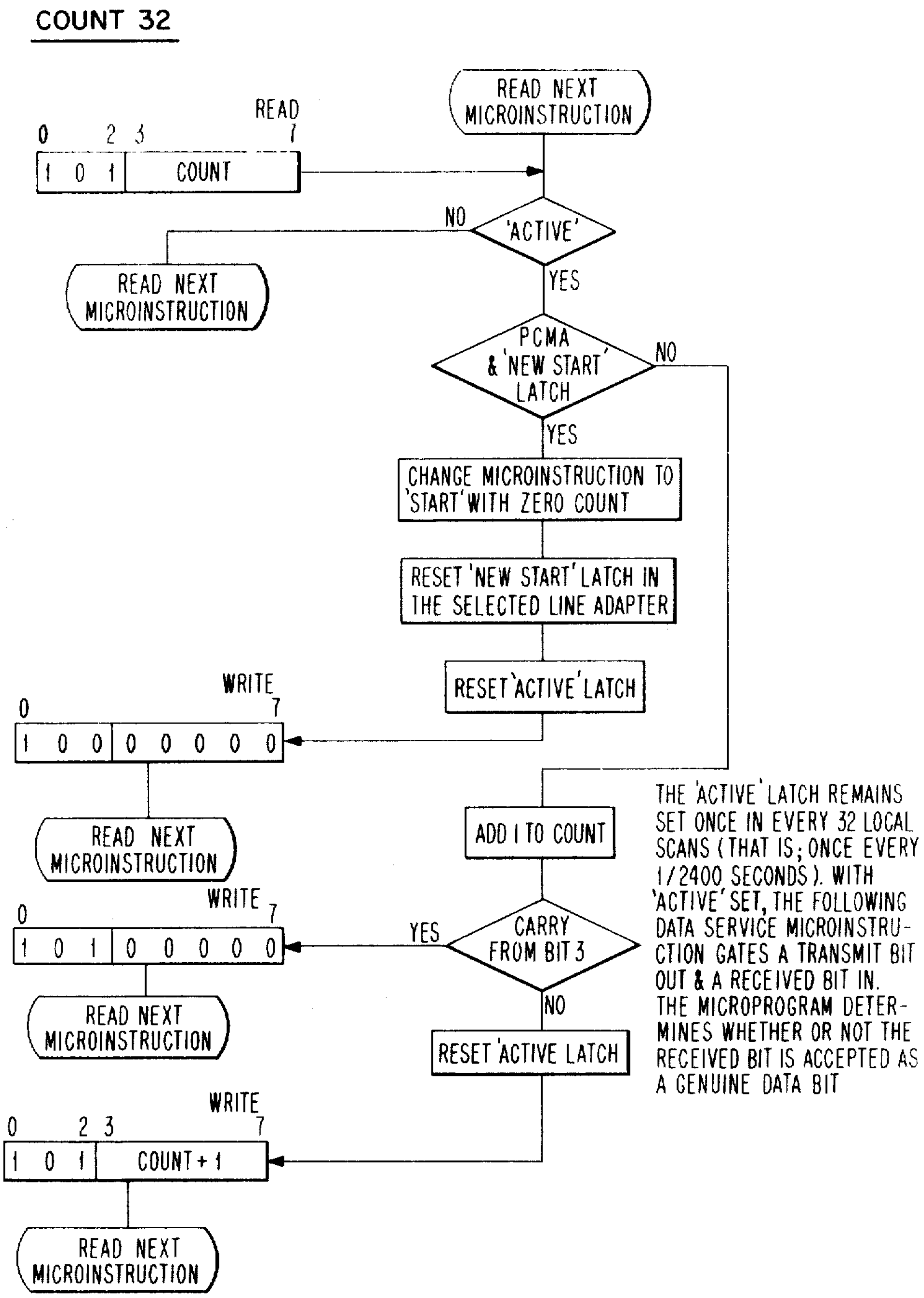

The operation of unit 2 is illustrated in FIGS. 8*a*, 8*b*. If the active latch 205 is set and a new start latch (not shown) in the adapter currently addressed by the microprogram routine containing the Count 32 microinstruction is set, the Count 32 microinstruction is changed to 1000 0000 (Binary). This causes instruction to be executed during the next cycle of the local store. The new start latch in the adapter and the active latch 205 are now reset.

If the active latch 205 is set and the new start latch in the adapter currently addressed is reset, the count, bits 3 to 7, is incremented by 1. Unless the overflow occurs, the active latch 205 is reset.

If the adapter currently addressed has no new start latch, the action taken depends on the setting of a new start latch (not shown) in a diagnostic adapter - 30W. By microprogram convention, this is normally zero, so that the count will be incremented as described above.

If the active latch is not set, no action takes place. N.B. The new start latch in an adapter (PCMA) can be set by a Write Tags microinstruction. This causes a Count microinstruction to be changed back to a Start microinstruction.

8. Hesitate

The Hesitate microinstruction (also the Count 32 microinstruction) is used to adjust the synchronism of a processor clocked line while the line is running. An external-type microinstruction of the processing system 1's microprogram modifies the Hesitate (or Count 32) microinstruction. The synchronization is effected by delaying (or advancing) the time at which that active latch will next be set. A value is written into the Hesitate microinstruction at any time before a succeeding Count 32 microinstruction is counted out. (An advance can be made by incrementing the Count 32 under the control of a microinstruction from the processing system.)

Figure 9B:
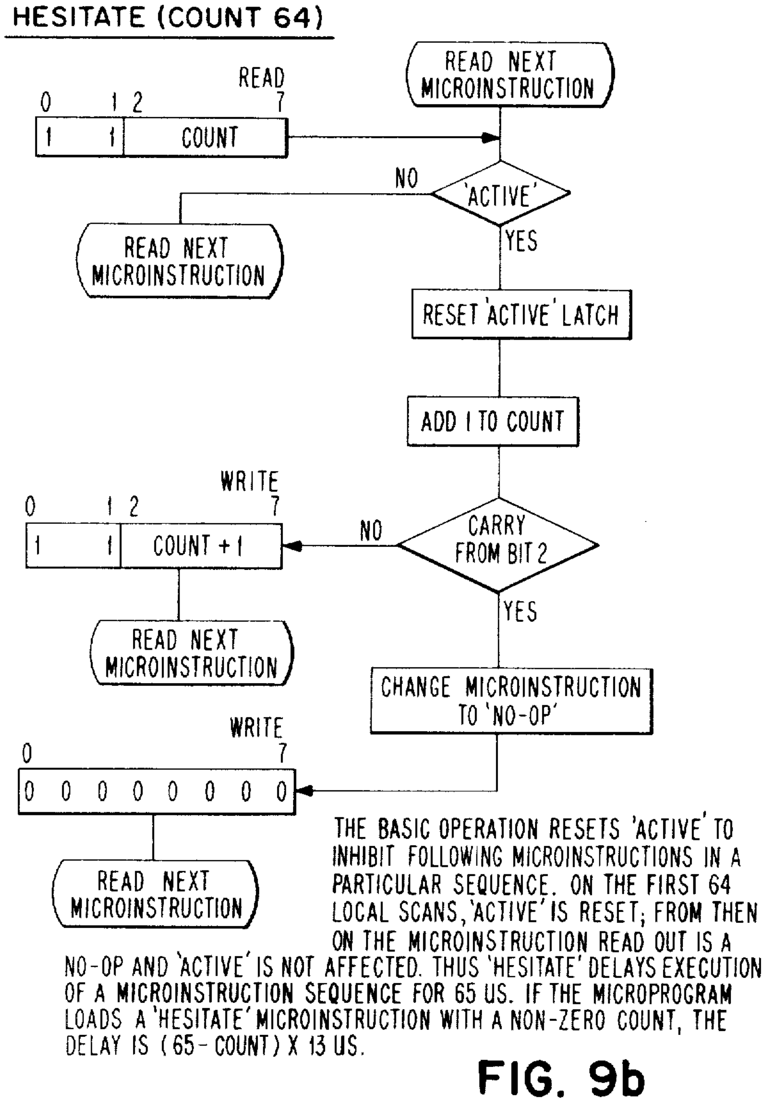
Figure 9A:
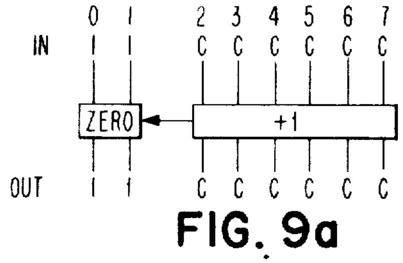

The operation of unit 2 is illustrated in FIGS. 9*a*, 9*b*.

If the active latch 205 is set, the count bits 2 to 7 is incremented by 1. If an overflow occurs, the entire byte is set to zero (NO OP) and the active latch 205 reset.

If the active latch 205 is not set, no operation takes place.

In the microprogram operation described above, no 'branch' instructions are used, thereby simplifying the control unit. Microinstructions are only executed if the active latch 205 is set; otherwise they are ignored.

A Set Interrupts are taken when the 'I' bit is on in the microinstructions:

Set Up
Data Service (1bit)
Data Service (2 bytes)

provided that the control unit is not already communicating with the processing system and that a microprogram interrupt latch (MINT) (not shown) is not on.

The I bit causes the adapter to SET a microprogram INTERRUPT request (MINT) and the contents of LAR 212 to transfer to bits 0 to 3 of BUS IN 213 and BUS IN 213 bits 4 to 7 are set to zero.

The control unit 2 can interrupt the processing system 1's microprogram at two levels. At the higher level the processing system microprogram examines a Data Service microinstruction or a Set Up microinstruction in the local store. At the lower level the control unit is interrupted to handle I/O instructions, a stacked multiplex interrupt or a time out.

The effect of the processing system 1's microinstructions on the operation of control unit 2 will now be described. Certain of the processing system's microinstructions cause signals to be latched in Control register 214 and BUS OUT register 215. The contents of registers 214 and 215 determine what operation is to be performed.

Certain processing system microinstructions do not interrupt the operation of the control unit 2 and are executed during the processing system cycles which initiate them. These include Read CHECKS, Read SAR, Write PBAR, Read BUS IN, Read STATS and Set STATS where CHECKS refer to Register 216 and STATS to Register 217.

Other processing system microinstructions are executed at the end of the current access to the store 26. As described above, these processing system microinstructions interrupt the local microinstructions routine for one cycle (165 nanoseconds). These microinstructions are Local store NO OP, Write PBAR and Execute, Write PBAR and Read, and WRITE LOCAL STORE and INVERT BITS. During an access to Local store 26 the old value of the byte accessed is transferred to BUS IN 213, e.g., LOCAL STORE NO-OP can be used to read the location currently addressed by PBAR. The next processing system initiated microinstruction will transfer the contents of BUS IN 213 to Local store 17.

Checks register 217 includes the following bits:

| | |
|---|---|
| bits 0 to 3 | are zero |
| bit 4 | interface check |
| bit 5 | SAR 27 check |
| bit 6 | SDR 218 check |
| bit 7 | ALU 25 output check |

One microinstruction transfers the contents of STATS register 217 to the communications zone of Work Store.

The contents are:

| | |
|---|---|
| bits 0 to 3 and bit 5 | zero |
| bit 4 | MINT register |
| bit 6 | Stacked Interrupt |
| bit 7 | I/O Operation |

Stats Register 217, checks register 216, etc., can be set according to Bus Out Register 215 as follows:

| Bus Out bit | |
|---|---|
| 0 | not used |
| 1 | Disable errors |
| 2 | Start local clock |
| 3 | Reset Checks |
| 4 | Reset MINT bit and BUS IN |
| 5 | Set Stack Interrupt bit |
| 6 | Reset Stack Interrupt bit |
| 7 | Reset I/O Operation bit |

In operations during the current processing system cycle, the old value of Bus In Register 213 is gated to the processing system's Bus In 22.

If Write PBAR is specified, the data byte supplied by the processing system is transferred via Bus out register 215 to pBAR 28. At the end of the current access to local store 26, the location specified by PBAR is accessed and its contents transferred to Bus In Register 213. Data can be modified or overwritten as follows:

Write

A processor microinstruction causes the contents of Bus Out to be written in to a local store location defined by a Write PBAR microinstruction described above.

Invert Bits

The contents of a location in local store accessed as described above are XOR'ed with the contents of BUS OUT 215 and the result written back into the Local store location.

Execute

A local store instruction is accessed and executed. When a Count microinstruction is executed (a count is incremented), the execution is inhibited if an overflow would have resulted.

In addition to an adapter for each communication line, the control unit 2 includes a 'diagnostic' adapter 30W, consisting of a data latch and five Tag latches, which are not connected to a communication line.

When the diagnostic adapter is addressed and a Data Service microinstruction is executed, data is taken from its data latch (not shown) instead of from a communication line. Latter in the instruction, data is written into the data latch instead of into a communication line. When the diagnostic adapter is addressed and a Write Tags Out microinstruction executed, the five tags are set from bits 3 to 7 of the instruction as before. However, when the Set Up microinstruction is executed, these Tags Out bits 3 to 7 are addressed instead of Tags In Bits 3 to 7. Tags Out bit 4 is used instead of the Signal Element Timing bit. When a count instruction is executed, Tags Out bit 7 is used as a new start latch.

The diagnostic adapter enables tests to be carried out on lines 23 which pass through each of the adapters 30A, 30B ... etc. in turn. These diagnostic tests indicate that the lines 23 are functioning correctly but cannot identify which adapter is malfunctioning when there is an error. However, the diagnostic tests performed by the processing system microprogram is sufficient to point to the area of the control unit which is malfunctioning, greatly simplifying the diagnostic routine.

For operation each communication line requires a Line Control Word (LCW) consisting of 16 bytes located in Control Store 11 of the processing system 1 and a timer count also located in control store 11.

Each Line Control Word contains the following information:

1. The address in local store 26 of the Data Service microinstruction for its particular Line;
2. The Tags In;
3. The type of line;
4. A data buffer;
5. Command codes, status bits, sense bits and various flags; and
6. Check bits.

As stated above, the processing system 1's microprogram handles at the higher interrupt level Data Service and Tag Change interrupts initiated by the control unit. At the lower level the processing system 1's microprogram handles channel instructions such as Start I/O, Test I/O and Halt I/O. At this level, the microprogram also handles Time-outs and Stacked interrupts. The operation of the processing system 1 microprogram is similar to that of the which has an integrated communications control operated by the processing system's microprogram.

The microprogram in store 26 is loaded during System Reset from the console file 110 by the processing sytem's microprogram. Initially the adapter Tags Out are set using the following sequence of microinstructions for each adapter:

Set Up 0
Set Up 1
Write Tags Out

Byte 0 of the Set Up microinstruction sets the active latch and places the line address in LAR. Write Tags out sets "Request to Send" in the adapter latches. Subsequently, the "Clear to Send" Tag In causes an interrupt.

This microprogram is then modified to provide a part of a Data Service sequence, Write Tags out being replaced by part of the Data Service sequence.

The Data Service sequence will now be described with reference to different types of terminal unit and transmission rates.

Example 1

One type of line to a known terminal operates on Start/stop at 134.5 bits/second. The terminal code comprises a 0 start bit followed by seven data bits and a 1 stop bit:

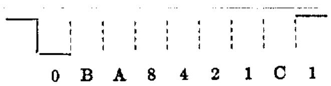

where ¦ show the possible transitions between bits.

The system and control unit perform the following operations during a Data Service:

Read

1. A start bit is detected by the control unit and transferred to the Line Control Word (LCW) in control store 11 associated with the line on which the data was received. Data bits are strobed and transferred to the LCW.
2. Data is assembled into bytes in LCW.
3. The validity of the data is checked by the processing system's microprogram.
4. A shift bit is inserted in place of the start bit.
5. A test is made to determine if the data is a control character.
6. The assembled bytes are then transferred from the LCW to main store 10.

Write

1. A byte is transferred from main store 10 to the appropriate LCW in control store.
2. A test is made for a shift change.
3. Start and Stop bits are added.
4. Data is transferred serially by bit to the control unit 2 and the appropriate line.
5. A test is made for line control characters.

During a read operation the microprogram in control unit initially "looks for the start bit". The microprogram sequence in store 26 is as follows:

Set Up 0
Set Up 1
NO OP B
Start
Count 32
Data Service (1 Bit Buffer)

Set Up Byte 0 sets the active latch in ALU 25 and loads the LAR. Set up byte 1 indicates that this line has a PCMA (Byte 1 bit 0 is 0) and monitors a tag change. If a Tag changes byte 1, bit 2 (interrupt) is set to 1 and the active state is reset. If there is no Tag change, the remaining microinstructions are executed. No op is accessed but no operation is performed by tHe ALU 25. Start resets the active state (latch 205) during each sequence until a start bit is detected, i.e., when the line voltage falls. The Start microinstruction is then incremented once every cycle through the store, i.e., every 13 microseconds until the count overflows. The active latch is reset during each sequence through the microinstructions associated with the particular line. After 32 increments (416 microseconds) the Start changes to a Count and increments the count of the next microinstruction before turning off the active latch 205. The cycling continues incrementing the first Count microinstruction once per cycle and the second Count microinstruction once every 32 cycles until the second count overflows, at which time the bit is sampled by the Data Service microinstruction and its interrupt bit set. Note that the second Count microinstruction is initially set to 23 to count a half bit (9 counts of 32).

Figure 10:
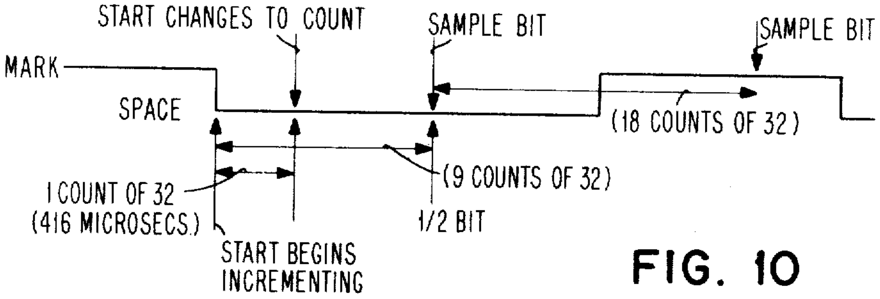

The start bit detection is illustrated in FIG. 10.

The data processing system 1 has a microprogram for performing the bit service as follows:

1. Read Data Service microinstruction in store 26.
2. Test overrun bit.
3. Check for start bit.
4. Accumulate vertical redundancy check (VRC).
5. Test for stop bit.
6. Transfer data bit from local store to LCW data buffer.
7. Set up local store for next bit service.

The setting up of the local store for the next bit data serivce with the following microcode in store 26 in place of the 'Look for Start' bit program.

Set Up 0
Set Up 1
Hesitate/No Op
Count
Count
Data Service (1 Bit BUffer)

A count is inserted into the Hesitate microinstruction to sychronize the sampling point halfway between bit transitions. The first Count microinstruction is initially all zeros and the second Count microinstruction is changed to 14 (18 counts of 32). The microprogram is now executed in the same way as the 'look for start' routine described above. The procedure for data service is repeated for each bit until the stop bit is detected by the data processing system's microprogram. The write bit data service microprogram in store 26 is the same as the read microprogram. The transmitted bit (T X D) is latched in the adapter.

The data processing system 1 also looks for control characters transmitted from the terminal. This portion of the microprogram performs the following functions:

1. Checks vertical redundancy.
2. Generates longitudinal redundancy check.
3. Tests for shift change character.
4. Tests for control characters.
5. Transfers data byte to main store 10.
6. Tests for byte count zero.
7. Sets up store 26 to look for start bit.

The terminal has the following control characters:

| | |
|---|---|
| Ⓝ | Negative response |
| Ⓨ | Positive response |
| Ⓓ | Start of Data |
| Ⓑ | End of data block |
| Ⓒ | End of message |
| 'Fill' | Character |
| Idle | Character |

Characters are transmitted to the terminal using a data service microprogram in local store, i.e., Set up byte 0
Set Up byte 1
Hesitate/NO OP
Count
Count
Data Service (1 Bit Buffer)

Processor system 1 microprogram performs the following additional functions when control characters are transmitted to a teminal:

1. Test for shift change.
2. Test for control characters.
3. Adds start and stop bits.

The terminal is addressed as follows:

1. Processing system 1 sends Ⓒ Terminal resets and goes into control mode
2. Processing system 1 sends Ⓓ Terminal recognizes address and prepares to receive data
3. Processing system 1 sends data followed by Ⓑ Terminal reads data and waits for longitudinal redundancy check (LRC)
4. Processing system 1 sends LRC and terminates Terminal checks LRC and sends Ⓨ or Ⓝ

The processing system microprogram also includes various 'time outs' to prevent 'hang ups' when reading or waiting for responses.

The terminal can be run at 600 bit/second, in which case the values of the second count instruction are appropriately reduced, i.e., for a data service the second Count is 29 (3 counts of 32) and the Hesitate instruction has a count of 3.

Example 2

Another type of communication line is that having a visual display unit. These display units require a control unit, for connection to a modem at the remote end of a communication line. Data is transmitted to these display units in Start/stop code at 1200 or 2400 bits per second.

For a MCMA the microprogram in store 26 for Read or Write is as follows:

| | | |
|---|---|---|
| Set up | 0 | 0 1 1 A L L L L |
| Set Up | 1 | 1 E I T T T T T |
| Data Service | 0 | 0 0 1 1 B S S S |
| Data Service | 1 | D D D D D D D D |
| Data Service | 2 | D D D D D D D D |

The MCMA Tags are set and determine if there is to be a Write or Read operation, i.e., for a Write, the write latch (bit 7 of Tags Out) is set.

The Set Up microinstruction byte 0 sets the active latch and selects the appropriate line. Set Up byte 1 resets the active latch except when the signal element timing bit is changed from 1 to 0. The data serivce comprises two data bytes, bytes 1 and 2, which are controlled by bit *B* of byte 0. The interrupt bit *I* is set when the count bits SSS indicate that one of the data buffers is full.

Byte structures used in data transfer are as follows. The processing system 1 provides data for I/O operations in ASC II - 8 code, i.e., bits 0 – 7 where bit 0 and bit 2 are equal.

However, the communication line transfers data in USASC II with start and stop bits, i.e., bits Sp, C, 1 – 7, St, where C is defined by even parity, Sp is a stop bit and St is a start bit.

Figure 11:
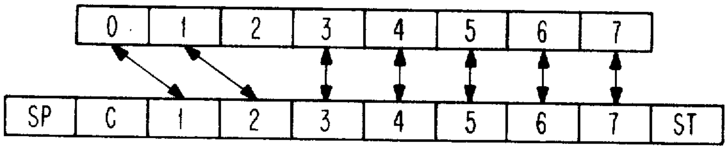

Code conversion is carried out as shown in FIG. 11.

During write, bit 2 is deleted (assuming it is zero), C bit is generated and stop and start bits are added. During read operation an even parity check is made. Start and Stop bits are deleted and bit 2 is set equal to bit 0. These code conversions are carried out by the microprogram of processing system 1.

In store 26 the above 10 bits of data are arranged in the data service microinstruction bytes 1 and 2 for a MCMA operated at any of the bit rates, say 2400 bits/second as follows:

Data Service byte 1

| | | | | | | | |
|---|---|---|---|---|---|---|---|
| 1 | 2 | 3 | 4 | 5 | 6 | 7 | St |

Data Service byte 2

| | | | | | | | |
|---|---|---|---|---|---|---|---|
| | | | | | | Sp | C |

The remaining bit positions in byte 2 can be occupied by bits of another data byte. Five data services to local store are required to transmit four bytes of data, i.e.,

| | | | | | | | | |
|---|---|---|---|---|---|---|---|---|
| Byte 0 | $D_1$ | $D_1$ | $D_1$ | $D_1$ | $D_1$ | $D_1$ | $D_1$ | St |
| Byte 1 | $D_2$ | $D_2$ | $D_2$ | $D_2$ | $D_2$ | St | Sp | $D_1$ |
| Byte 2 | $D_3$ | $D_3$ | $D_3$ | St | Sp | $D_3$ | $D_2$ | $D_2$ |
| Byte 3 | $D_4$ | St | Sp | $D_3$ | $D_3$ | $D_3$ | $D_3$ | $D_3$ |
| Byte 4 | Sp | $D_4$ | $D_4$ | $D_4$ | $D_4$ | $D_4$ | $D_4$ | $D_4$ |

During a MCMA read, as there are an undefined number of stop bits between characters, a start bit can occur in any one of the bit positions of a Data Service byte.

For a PCMA the microprogram in local store 26 is different, depending on whether it is a read or write operation.

PCMA Write uses the following microprogram:

| | | |
|---|---|---|
| Set Up | 0 | 0 1 1 A L L L L |
| Set Up | 1 | 0 0 1 T T T T T |
| Count 32 | | 1 0 1 C C C C C |
| Data Service | 0 | 0 0 1 1 B S S S |
| Data Service | 1 | D D D D D D D D |
| Data Service | 2 | D D D D D D D D |

The Count 32 microinstruction permits active latch to remain on for the Data Service bytes 2400 times per second. However, the data rate for a PCMA is 1200 bytes per second. Accordingly, to reduce the data rate, each bit is transmitted twice, i.e., two data bytes (10 bits) require 5 Data Services.

| | | | | | | | |
|---|---|---|---|---|---|---|---|
| 5 | 5 | 6 | 6 | 7 | 7 | St | St |
| 1 | 1 | 2 | 2 | 3 | 3 | 4 | 4 |
| 7 | 7 | St | St | Sp | Sp | C | C |
| 3 | 3 | 4 | 4 | 5 | 5 | 6 | 6 |
| Sp | Sp | C | C | 1 | 1 | 2 | 2 |

PCMA Read uses the following microprogram:

| | | |
|---|---|---|
| Set Up | 0 | 0 1 1 A L L L L |
| Set Up | 1 | 0 0 1 T T T T T |
| Start/Count | | 1 0 0 C C C C C |
| Data Service | 0 | 0 0 1 1 B S S S |
| Data Service | 1 | D D D D D D D D |
| Data Service | 2 | D D D D D D D D |
| Count 18 | | 1 0 1 C C C C C |
| Write Tags (New Start) | | 0 1 0 0 0 1 1 1 |

Figure 12:
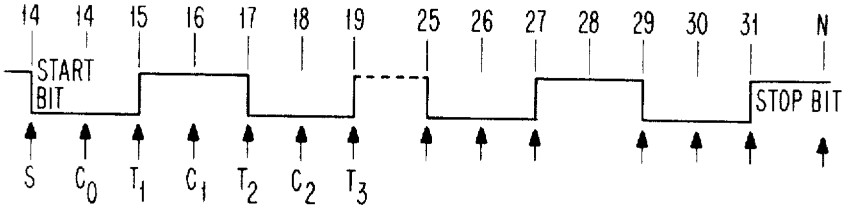

The Start microinstruction looks for a start bit and ensures that a transition is at least 416 microseconds long (count of 32). When start has been successfully counted out, it converts to a Count 32 microinstruction as shown in FIG. 12.

As S the Start microinstruction begins to increment. At $C_0$ the Start has counted out and changes to a Count 32. At $T_1$ the Count 32 has counted out for the first time and the Data Service microinstruction is executed, i.e., the transition bit, a 0 or 1 depending on whether the strobe occurs on a 0 or 1 bit respectively is stored in one of the Data Service data bytes. The Count 18 microinstruction is executed after each Data Service. There are 18 strobe points in each transmitted byte of ten bits. The Write Tags (New start) is executed only when the count 18 has been counted out. This permits a new Start instruction to be written into the microprogram by the processing system 1's microcode and resets the Count 18 microinstruction to a count of 14.

The data in the Data Service bytes 1 and 2 is arranged as follows:

| | | | | | | | |
|---|---|---|---|---|---|---|---|
| 4 | T | 3 | T | 2 | T | 1 | T |
| C | T | 7 | T | 6 | T | 5 | T |

Nine Set Interrupts are required to transfer 4 bytes to the processing system 1. Processing system 1 separates the data from the transitions before storing the data in the LCW buffer. The processing system 1 microprogram uses the transitions to determine whether the line is running fast or slow. The Count 32 can be incremented by the processing system if the line is running fast, or a hesitate instruction can be used in the line is running slow. The bit rate is limited to a rate equal to one half or less than one half the strobe rate.

Control characters appropriate to the particular terminal or line are handled as described for the 1050 terminal.

The processing system 1 microprogram assembles characters, detecting control characters and handles line control.

Example 3

A further type of a communication line operates in binary synchronous mode at 600 bits per second upwards. There are no Start or Stop bits and the processing system 1 must be capable of buffering the whole of the message. A typical terminal uses a line adapter of the type referred to earlier. Alternatively, the line may be to a further processing system with a suitable adapter.

The operation can be with a MCMA or PCMA. The MCMA uses the same microprogram for read or write in local store 26 as for the Start/Stop mode, e.g.,

| | | |
|---|---|---|
| Set Up | 0 | 0 1 1 A L L L L |
| Set Up | 1 | 1 E I T T T T T |
| Data Service | 0 | 0 0 1 1 B S S S |
| Data Service | 1 | D D D D D D D D |
| Data Service | 2 | D D D D D D D D |

The MCMA provides clock pulses for receive and transmit signals. The signal element timing provided for byte 1 of the Set Up is either the transmit or receive according to the setting of a write latch in the MCMA.

The PCMA microprogram for read or write is:

| | | |
|---|---|---|
| Set Up | 0 | 0 1 1 A L L L L |
| Set Up | 1 | 0 0 1 T T T T T |
| No Op/Hesitate | | 0 0 0 0 0 0 0 0 |
| Count 32 | | 1 0 1 C C C C C |
| Data Service | 0 | 0 0 1 1 B S S S |
| Data Service | 1 | D D D D D D D D |
| Data Service | 2 | D D D D D D D D |

Figure 13:
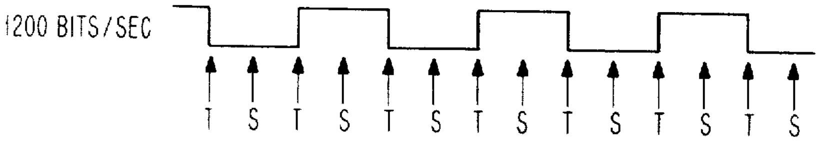
Figure 14:
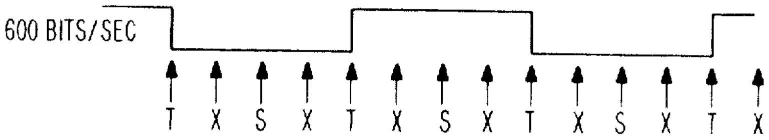

The Count 32 allows a Data Service 2400 times per second. Incrementing the count by means of a microinstruction from processing system 1 advances the Data Service while the use of a Hesitate microinstruction delays the Data Service. The data Services for a receive signal are shown in FIGS. 13 and 14.

where T is a transition, S is a sample or strobe point and *x* points are ignored.

An analysis of the values of the transitions T provides the necessary information to maintain synchronism. Processing system 1 microprogram handles the input data in a similar way to Start/Stop operation, e.g., for Read 1. Data is transferred from store 26 to an LCW in Control Store 11.
2. Data in the LCW is analyzed. Flags and status are set.
3. Data is transferred from LCW to main store 10. Data chaining is initiated if necessary.
4. An interrupt or command chain is initiated if necessary.

for Write

1. Data is transferred from main store 10 to an LCW (previous cycle).
2. Data is transferred from the LCW to store 26.
3. Further data is transferred from main store 10 to the LCW. Data chaining is initiated if necessary.
4. The data is analyzed and Flags and status are set in the LCW.
5. Interrupt or command chaining is initiated if necessary.

The tags in the adapters could be set directly by the processing system 1's microprogram instead of by a Write Tags microinstruction stored in store 26. The Control Unit 2 requires additional registers and logic if this function is to be performed by the processing system 1.

As noted above, the microprogram in store 26 does not contain branch microinstructions. The absence of branch instructions greatly simplifies the design of the control unit 2, particularly the ALU. The ALU is further simplified by only having to increment the count in the various microinstructions, i.e., to advance the count, a processing system 1 microinstruction increments the count, and to delay the count, processing system 1 inserts a Hesitate microinstruction with a value to be incremented out.

The microprogram in store 26 can be organized differently from that described above. For example, the store can have a microprogram arranged as follows:

| Location | |
|---|---|
| 00 | Unused |
| 01 | Adapter 1 control byte |
| 02 | Adapter 2 control byte |
| 03 | Adapter 3 control byte |
| 04 | |
| \| | \| \| \| \| |
| 07 | Adapter 7 control byte |
| Locations | |
| 10 – 13 | Adapter 0 Buffer 0 |
| 14 – 17 | Adapter 0 Buffer 1 |
| 20 – 23 | Adapter 1 Buffer 0 |
| 24 – 27 | Adapter 1 Buffer 1 |
| \| \| | \| \| |
| 70 – 73 | Adapter 7 Buffer 0 |
| 74 – 77 | Adapter 7 Buffer 1 |

where the above storage locations are in octal notation.

The operation of the microprogram is as follows:

Location 01 is accessed and the control byte indicates if Adapter 1 is active and which buffer is being used. The control byte also monitors Tags In and sets an interrupt if the Tags In change. From location 01 the accessing branches to location 10 or 14 according to a value in the control byte to execute one of the buffer microprograms. The buffer locations synchronize the store with the line speed and buffer data read from or transmitted to the line. Synchronization is achieved by using count instructions as described above in Examples 1 to 3. After executing one or more of the microinstructions in locations 10 to 13 or 14 to 17, the microprogram branches to the second control byte at location 02 and subsequently to either location 20 or location 24. This sequence is repeated for each adapter. At any time the processor can interrupt to sequence, to execute a microinstruction at any one of the locations, to write, modify, or read the data at that location. In other ways the operation of the control unit is the same.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In a data processing system having a plurality of communication lines interconnecting a central processor with different types of terminals by way of modems terminating both ends of each line and means within the processor producing signals for controlling data transfer between the processor and the terminals, an integrated control unit comprising a plurality of similar adapters having means for storing tags, each adapter coupling a respective one of the lines to the control unit, a store storing a group of microinstructions for each line, each group including control, timing and data service instructions for respectively monitoring lines for incoming data and control signals, synchronizing the control unit with line data rates, and controlling data transfers between the lines and the store, each timing instruction having an initial count value which is a function of the rate at which data is transmitted over its line, means for periodically accessing the microinstructions in sequence, means responsive to a processor request for data transfer over one of the lines for modifying the logical state of a bit in a first control instruction in the group corresponding to the one line after the latter instruction is accessed, thereby indicating the line to be active for transmitting data thereover, means responsive to the modified instruction when it is thereafter accessed for permitting execution of succeeding control and timing instructions in the corresponding group each time they are subsequently accessed, means thereafter effective upon execution of the timing instructions of the corresponding group a predetermined number of times determined by the initial count values for executing a succeeding data service instruction in the corresponding group to transfer data between said one line and a location in the store holding a data field of the data service instruction, and means responsive to the processor signals for transferring data between the processor and the location in the store holding the data field of the data service instruction.

2. In a data processing system having a plurality of communication lines interconnecting a central processor with different types of terminals by way of modems terminating both ends of each line, and having microprogram instruction storage and control means integral with the processor for controlling the modems and terminals for transfer of information between the processor and terminals, in combination with said lines and processor, a data transfer control means comprising a local storage means for storing local microinstruction sets for each line;

means including a source of periodic signals for periodically accessing the microinstructions one at a time in sequence;

the sets including in order control microinstructions, timing microinstructions having initial count values therein which are a function of the data rates on their lines, and data service microinstructions having fields for storing data to be transferred between the processor and a respective terminal;

local store microinstruction responsive means including an arithmetic and logical unit, an active latch, means responsive to local store microinstructions in each set for controlling the set and reset states of the latch, and means responsive to the set and reset states of the latch for rendering the arithmetic and logic unit effective to respectively permit and inhibit the execution of succeeding microinstructions in the set;

means responsive to processor signals for transferring data between the processor and local store locations storing data service microinstructions;

said local store microinstruction responsive means responsive to signals produced by each data service microinstruction when accessed after the active latch is set by a next preceding microinstruction for transferring data between the location storing the data service microinstruction and the modem terminating the line corresponding to the set;

said local store microinstruction responsive means responsive to local control microinstructions during said periodic accessing for setting the latch to control the rate of data transfer between the modems and locations storing respective data service microinstructions by monitoring respective modem clocked lines to set the latch when a modem clock signal appears on the respective line; and said local store microinstruction responsive means responsive to local timing microinstructions during said periodic accessing for setting the latch to control the rate of data transfer between the modems and locations storing respective data service microinstructions by sequentially updating count values in the timing microinstructions, once for each periodic access, from their initial values to a predetermined value to set the latch when said predetermined value is reached.

3. A method of synchronizing the transfer of data between a central processor and communication lines by means of processor and modem clocked adapters which adapters are independent of data transfer rates, said method comprising the steps of connecting each line to the processor alternatively by a processor clocked or a modem clocked adapter, storing sets of microinstructions in a local store, one set for each line and its adapter, periodically accessing the microinstruction sets in the local store in sequence, each microinstruction including control indicia, and each microinstruction further including a field from a group including a line monitoring field, a count field having an initial count value and a data buffer field, assigning initial values to the count fields of timing microinstructions which initial values are a function of the data rates on lines corresponding to the microinstructions, said processor initiating data transfer requests, initializing a first control microinstruction in a desired microinstruction set by setting a status bit therein when it is accessed subsequent to one of said initiated data transfer requests, executing each subsequent timing microinstruction in an initialized local store microinstruction set of a processor clocked adapter as it is accessed to update the count by a selected value, synchronizing the processor clocked adapters with the accessing of the store by electrically sensing timing instruction count values during the execution of timing instructions to determine when the values have changed to a fixed second value and by thereafter executing a next succeeding data service instruction when it is subsequently accessed to transfer data between a respective line and a data buffer field of the service instruction, and synchronizing the modem clocked adapters with the accessing of the store by electrically sensing timing signals from the modem when control microinstructions of initialized sets are accessed and by executing succeeding data service microinstructions in initialized sets when they are thereafter accessed.

4. A method of transferring data between a central processor and communication lines using similar adapters independent of data transfer rates, said method comprising the steps of periodically accessing from a local store a microinstruction set of separate control, count and data service microinstructions for each line in sequence, the timing microinstructions having in count fields thereof initial count values which are a function of the data rates on their respective lines, processor initializing a respective microinstruction set incident to each data transfer request by changing active status indicia in the control microinstruction of the set when it is accessed and by returning the microinstruction to the local store, setting an active latch with said status indicia each time that the control microinstruction of the initialized set is thereafter accessed, monitoring the respective line for a change in signal level each time that the control microinstruction of the initialized microinstruction set is accessed to maintain the latch set, said active latch signaling the execution of the timing microinstructions of the initialized set when they are accessed while the latch is maintained set, incrementing count values in count microinstructions each time they are executed, from the initial count values toward a selected second value, electrically detecting when the second value is reached during the execution of a count microinstruction, signaling the execution of data service microinstructions in the initialized set when accessed after the second count value is detected, transferring data between a data field of a data service microinstruction and the respective line under control of the data service microinstruction when the data service microinstruction is accessed and executed, issuing interrupt signals when control and data service microinstructions are accessed and executed, and transferring data between the processor and data fields of data service microinstructions under processor control incident to the issuance of an interrupt signal

5. In a data processing system having a plurality of communication lines interconnecting a central processor with different types of terminals by way of modems terminating both ends of each line and means within the processor producing signals for controlling data transfer between the processor and the terminals, apparatus for generating a plurality of variable timeout intervals on a time-shared basis, for controlling said rate of data transfer, comprising, a local storage means for storing in sequence a plurality of sets of microinstruction words, there being one set for each timeout interval being generated, each set including at least one control microinstruction followed by a first timing microinstruction having an initialized count value stored in a field therein, means for executing the microinstructions, accessing means including an address register and an incrementer for reading out all of the microinstructions in sequence one at a time from the storage means into said executing means, a periodically recurring timing signal rendering the accessing means effective once for each timing signal to read out all of said microinstructions, means included in the executing means responsive to each timing microinstruction for updating the count value of the timing microinstruction when it is executed in the executing means, an active latch, decode logic responsive to the control microinstruction in a set for setting the latch to a selected state to indicate the initiation of one of said timeout intervals, said executing means permitting the execution of the first timing microinstruction in the set only if said latch is set to said selected state when the timing instruction is read into the executing means, means included in the executing means responsive to each timing microinstruction when it is executed for transferring its updated count value to the microinstruction field in the storage means, and means responsive to a predetermined updated count value in each timing microinstruction in the executing means for generating an output signal indicating the completion of said one timeout interval.

6. The apparatus of claim 5 further comprising a second timing microinstruction in the storage means following the first timing microinstruction in one of the sets, said second timing microinstruction having an initialized count value stored therein, means including said latch responsive to the timeout indicating output signal corresponding to the first timing microinstruction of the one set for permitting the execution of the second timing microinstruction when it is read into the executing means, thereby causing updating of its count value, said output signal generating means being responsive to a predetermined updated count value in the second timing microinstruction for generating an output signal indicating completion of one of said timeout intervals.

* * * * *